(12) United States Patent
Inoue et al.

(10) Patent No.: US 9,599,876 B2
(45) Date of Patent: Mar. 21, 2017

(54) PERIODIC POLARIZATION REVERSAL ELECTRODE, PERIODIC POLARIZATION REVERSAL STRUCTURE FORMING METHOD AND PERIODIC POLARIZATION REVERSAL ELEMENT

(71) Applicant: SHIMADZU CORPORATION, Kyoto-shi, Kyoto (JP)

(72) Inventors: Kazuya Inoue, Kyoto (JP); Katsuhiko Tokuda, Kyoto (JP); Mamoru Hisamitsu, Kyoto (JP); Kazutomo Kadokura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 123 days.

(21) Appl. No.: 14/595,711

(22) Filed: Jan. 13, 2015

(65) Prior Publication Data

US 2016/0202595 A1   Jul. 14, 2016

(51) Int. Cl.
*G02F 1/35*  (2006.01)
*G02F 1/355*  (2006.01)
*G02F 1/377*  (2006.01)

(52) U.S. Cl.
CPC .......... *G02F 1/3558* (2013.01); *G02F 1/3551* (2013.01); *G02F 1/3775* (2013.01); *G02F 1/3544* (2013.01); *G02F 2001/3548* (2013.01)

(58) Field of Classification Search
CPC ................ G02F 1/3558; G02F 1/3775; G02F 2001/3548
See application file for complete search history.

(56) References Cited

U.S. PATENT DOCUMENTS

| 5,193,023 A | * | 3/1993 | Yamada | G02F 1/3558 |
| | | | | 359/245 |
| 5,436,758 A | * | 7/1995 | Agostinelli | G02F 1/3775 |
| | | | | 359/326 |
| 5,526,173 A | * | 6/1996 | Yamaguchi | G02F 1/3558 |
| | | | | 359/328 |
| 5,756,263 A | * | 5/1998 | Gupta | G02F 1/3558 |
| | | | | 359/328 |

(Continued)

FOREIGN PATENT DOCUMENTS

JP    2005-208197 A    8/2005

*Primary Examiner* — Daniel Petkovsek
(74) *Attorney, Agent, or Firm* — Sughrue Mion, PLLC (57) ABSTRACT

A periodic polarization reversal electrode, periodic polarization reversal structure forming method and periodic polarization reversal element. The element includes a plurality of stripe electrode sections with a stripe shape extending in parallel at a gap from each other, arranged in contact with the +Z surface of a ferroelectric crystal substrate; an insulation film arranged over the +Z surface so as to cover the plurality of stripe electrode sections; and an equipotential electrode section which has a portion that opposes at least a part of each of the plurality of stripe electrode sections across the insulation film and is arranged over the insulation film without contacting the ferroelectric crystal substrate or the plurality of stripe electrode sections, wherein an electric field is generated in the area of the ferroelectric crystal substrate directly below the plurality of stripe electrode sections by applying a voltage to the equipotential electrode section.

6 Claims, 7 Drawing Sheets

(56) References Cited

U.S. PATENT DOCUMENTS

| | | | | |
|---|---|---|---|---|
| 5,800,767 A * | 9/1998 | Byer | ............. | G02F 1/3558 |
| | | | | 264/430 |
| 5,875,053 A * | 2/1999 | Webjorn | ............. | G02F 1/3558 |
| | | | | 204/157.15 |
| 6,952,307 B2 * | 10/2005 | Apostolopoulos | .... | G02F 1/3775 |
| | | | | 359/279 |
| 2005/0181525 A1 | 8/2005 | Tokuda et al. | | |
| 2006/0049133 A1 * | 3/2006 | Chiang | ............. | G02F 1/3558 |
| | | | | 216/22 |
| 2011/0032597 A1 * | 2/2011 | Gawith | ............. | G02F 1/3558 |
| | | | | 359/326 |

\* cited by examiner

PERIODIC POLARIZATION REVERSAL ELECTRODE, PERIODIC POLARIZATION REVERSAL STRUCTURE FORMING METHOD AND PERIODIC POLARIZATION REVERSAL ELEMENT

TECHNICAL FIELD

The present invention relates to a periodic polarization reversal electrode for forming a periodic polarization reversal element using a ferroelectric crystal substrate and to a periodic polarization reversal structure forming method and periodic polarization reversal element.

BACKGROUND ART

Periodic polarization reversal elements using a ferroelectric crystal substrate are employed as wavelength conversion elements which are used for obtaining laser light of a desired wavelength and the like. In a periodic polarization reversal element, a periodic polarization reversal structure whereof the polarization direction reverses periodically is formed on a ferroelectric crystal substrate. For example, a periodic polarization reversal element can output laser light of a wavelength which is a second harmonic by performing quasi phase matching on the inputted laser light. Periodic polarization reversal elements are thus used as quasi phase matching (QPM) type wavelength conversion elements.

To form a periodic polarization reversal structure, methods are employed such as reversing the spontaneous polarization direction by applying voltage between electrodes arranged on the +Z surface and −Z surface perpendicular to the polarization direction of the ferroelectric crystal substrate (for example, see Patent Literature 1). The shape and area of the periodic polarization reversal structure to be formed are determined by the shape of the electrodes arranged on the ±Z surfaces. Generally, the electrodes arranged on the ±Z surfaces are formed by forming a metal into film.

The metal electrodes arranged on the +Z surface comprise stripe electrode sections formed from a continuous metal film and arranged, for example, at a fixed pitch, and an equipotential electrode section which is connected to the stripe electrode sections in order to keep the stripe electrode sections at a uniform potential. Specifically, comb-shaped electrodes and ladder-shaped electrodes have been used. The electrode on the −Z surface which opposes the electrodes formed on the +Z surface across the ferroelectric crystal substrate is formed as a metal film solid electrode (planar electrode).

For example, a predetermined voltage is applied between a ladder-shaped electrode (top surface electrode) arranged on the +Z surface of the ferroelectric crystal substrate and a solid electrode (bottom surface electrode) arranged uniformly over the −Z surface of the ferroelectric crystal substrate. At this time, due to the electric field generated in the ferroelectric crystal substrate, polarization reversal occurs directly below the stripe electrode sections (crosspiece parts) on the +Z surface, and a periodic polarization reversal structure is formed inside the ferroelectric crystal substrate.

PRIOR ART LITERATURES

Patent Literatures (Patent Literature 1) Japanese Unexamined Patent Application Publication 2005-208197

SUMMARY OF THE INVENTION

Problem to be Solved by the Invention

By providing the equipotential electrode section, all of the stripe electrode sections are kept at a uniform potential. However, if no solid electrode is provided directly below the ends of the stripe electrode sections which connect to the equipotential electrode section, the shape of the ends of the periodic polarization reversal structure formed by the electric field generated between the stripe electrode sections and the solid electrode will not be uniformly aligned. Furthermore, if a solid electrode is provided directly below the ends of the stripe electrode sections, a polarization reversal structure will end up being formed also directly below the equipotential electrode section, where there is no need for polarization reversal to begin with. In this way, there is the problem that it is difficult to uniformly control the ends of the periodic polarization reversal structure.

In view of the problem described above, it is an object of the present invention to provide a periodic polarization reversal electrode, periodic polarization reversal structure forming method and periodic polarization reversal element which make it possible to uniformly control the shape of the ends of the periodic polarization reversal structure.

Means for Solving the Problem

According to one aspect of the present invention, there is provided a periodic polarization reversal electrode comprising (a) a plurality of stripe electrode sections with a stripe shape extending in parallel at a gap from each other, arranged in contact with the +Z surface of a ferroelectric crystal substrate, (b) an insulation film arranged over the +Z surface so as to cover the plurality of stripe electrode sections, and (c) an equipotential electrode section which has a portion that opposes at least a part of each of the plurality of stripe electrode sections across the insulation film and is arranged over the insulation film without contacting the ferroelectric crystal substrate or the plurality of stripe electrode sections, wherein an electric field is generated in the area of the ferroelectric crystal substrate directly below the plurality of stripe electrode sections by applying a voltage to the equipotential electrode section.

According to another aspect of the present invention, there is provided a periodic polarization reversal structure forming method comprising: (a) a step of forming a plurality of stripe electrode sections with a stripe shape extending in parallel at a gap from each other, on the +Z surface of a ferroelectric crystal substrate in contact with the ferroelectric crystal substrate, (b) a step of forming an insulation film over the +Z surface so as to cover the plurality of stripe electrode sections, (c) a step of forming an equipotential electrode section, which has a portion that opposes at least a part of each of the plurality of stripe electrode sections across the insulation film, over the insulation film without contacting the ferroelectric crystal substrate or the plurality of stripe electrode sections, (d) a step of forming a planar electrode, on the −Z surface of the ferroelectric crystal substrate that opposes the +Z surface, so as to cover the entire area that opposes the +Z surface area on which the plurality of stripe electrode sections are formed, and (e) a step of applying a voltage between the equipotential electrode section and the planar electrode to generate an electric field between the plurality of stripe electrode sections and the planar electrode and create a polarization reversal structure on the ferroelectric crystal substrate directly below the plurality of stripe electrode sections.

According to yet another aspect of the present invention, there is provided a periodic polarization reversal element comprising a periodic polarization reversal structure formed using a periodic polarization reversal structure forming method comprising a step of forming a plurality of stripe electrode sections with a stripe shape extending in parallel at a gap from each other, on the +Z surface of a ferroelectric crystal substrate in contact with the ferroelectric crystal substrate; a step of forming an insulation film over the +Z surface so as to cover the plurality of stripe electrode sections; a step of forming an equipotential electrode section, which has a portion that opposes at least a part of each of the plurality of stripe electrode sections across the insulation film, over the insulation film without contacting the ferroelectric crystal substrate or the plurality of stripe electrode sections; a step of forming a planar electrode, on the −Z surface of the ferroelectric crystal substrate that opposes the +Z surface, so as to cover the entire area that opposes the +Z surface area on which the plurality of stripe electrode sections are formed; and a step of applying a voltage between the equipotential electrode section and the planar electrode to generate an electric field between the plurality of stripe electrode sections and the planar electrode and create a polarization reversal structure on the ferroelectric crystal substrate directly below the plurality of stripe electrode sections.

Effect of the Invention

According to the present invention, it is possible to provide a periodic polarization reversal electrode, periodic polarization reversal structure forming method and periodic polarization reversal element which make it possible to uniformly control the shape of the ends of the periodic polarization reversal structure.

BRIEF DESCRIPTIONS OF THE DRAWINGS

FIG. 1(a) is a plan view and FIG. 1(b) is a cross-sectional view in the direction I-I of FIG. 1(a).

FIG. 2(a) is a plan view and FIG. 2(b) is a cross-sectional view in the direction II-II of FIG. 2(a).

FIG. 3(a) is a plan view and FIG. 3(b) is a cross-sectional view in the direction III-III of FIG. 3(a).

FIG. 4(a) is a plan view and FIG. 4(b) is a cross-sectional view in the direction IV-IV of FIG. 4(a).

FIG. 7(a) is a plan view and FIG. 7(b) is a cross-sectional view in the direction VII-VII of FIG. 7(a).

FIG. 9(a) is a plan view and FIG. 9(b) is a cross-sectional view in the direction IX-IX of FIG. 9(a).

DETAILED DESCRIPTION OF THE EXEMPLARY EMBODIMENTS

An embodiment of the present invention will be described with reference to the drawings. In the following description of the drawings, the same or similar parts are assigned the same or similar reference symbols. It should be noted that the drawings are schematic, and the relationship between thickness and planar dimensions, the ratio of thickness of each layer, etc. differ from the actual. Therefore, the concrete thicknesses and dimensions should be judged in consideration of the description below. The drawings of course also contain parts for which the dimensional relationship and ratios differ among the drawings.

Furthermore, the embodiment presented below exemplifies the device and method for implementing the technical idea of this invention, and this embodiment of the invention does not limit the component materials, shapes, structure, arrangement, etc. to those described below. This embodiment of the invention can be modified in various ways within the scope of the patent claims.

The periodic polarization reversal electrode 10 according to an embodiment of the present invention, as shown in FIG. 1(a) and FIG. 1(b), comprises a plurality of stripe electrode sections 11 with a stripe shape extending in parallel at a gap from each other, arranged in contact with the +Z surface 21 perpendicular to the polarization direction of the ferroelectric crystal substrate 20; an insulation film 30 arranged over the +Z surface 21 so as to cover the entirety of the plurality of stripe electrode sections 11; and an equipotential electrode section 12 which is arranged over the insulation film 30 and has a portion which opposes at least a part of each of the plurality of stripe electrode sections 11 across the insulation film 30.

As shown in FIG. 1(b), the equipotential electrode section 12 is arranged over the insulation film 30 without contacting the ferroelectric crystal substrate 20 or the plurality of stripe electrode sections 11. In the example shown in FIG. 1(a) and FIG. 1(b), the equipotential electrode section 12 is arranged opposite the entirety of the plurality of stripe electrode sections 11. In FIG. 1(a), the stripe electrode sections 11 arranged below the equipotential electrode section 12 and insulation film 30 are shown with a dashed line (the same hereafter).

As shown in FIG. 1(a), a planar electrode 40 is arranged over the −Z surface 22 of the ferroelectric crystal substrate 20 opposite the +Z surface 21. In other words, the ferroelectric crystal substrate 20 is sandwiched between the periodic polarization reversal electrode 10 and the planar electrode 40. The planar electrode 40 is arranged so as to at least cover the entire area which opposes the area of the +Z surface 21 where the stripe electrode sections 11 are arranged. Therefore, the planar electrode 40 is provided below the ends of the stripe electrode sections 11.

When voltage is applied between the equipotential electrode section 12 and the planar electrode 40, a voltage is applied via the insulation film 30 to the stripe electrode sections 11. The stripe electrode sections 11 in their entirety are maintained at a uniform potential by means of the equipotential electrode section 12. Applying a voltage to the equipotential electrode section 12 causes an electric field to be generated in the area of the ferroelectric crystal substrate 20 directly below the stripe electrode sections 11.

The magnitude of the voltage applied between the equipotential electrode section 12 and the planar electrode 40 is set so that a polarization reversal structure will be generated in the area of the ferroelectric crystal substrate 20 directly below the stripe electrode sections 11 by applying a predetermined voltage between the equipotential electrode section 12 and the planar electrode 40. The voltage level at which a polarization reversal structure is generated in the ferroelectric crystal substrate 20 can be obtained by performing experiments in advance or the like. As a result, the voltage level to be applied is determined such that, for example, the electric field generated in the ferroelectric crystal substrate 20 will be greater than the coercive electric field necessary for polarization reversal of the ferroelectric crystal.

When a predetermined voltage is applied between the stripe electrode sections 11 and the planar electrode 40, an electric field is concentrated in the ferroelectric crystal substrate 20 directly below the side surface of the stripe electrode sections 11. Thus, a large difference in electric field arises below the stripe electrode sections 11 versus below the area between stripe electrode sections 11. As a result, the boundaries become clear between the areas of the ferroelectric crystal substrate 20 where polarization reversal occurs, i.e. the areas directly below the stripe electrode sections 11, and the areas where polarization reversal does not occur, i.e. the areas below the space between stripe electrode sections 11. By employing the periodic polarization reversal electrode 10 as described above, a periodic polarization reversal element is obtained wherein a periodic polarization reversal structure whereof the polarization direction reverses periodically is formed in the ferroelectric crystal substrate 20.

The stripe electrode sections 11 are arrayed at a fixed pitch t. The width w of a stripe electrode section 11 and the gap d between stripe electrode sections 11 are set according to the required characteristics of the element to be manufactured using the ferroelectric crystal substrate 20.

For example, when the periodic polarization reversal element is to be used as a QPM type wavelength conversion element, the pitch t can be suitably determined according to the refractive index of the ferroelectric crystal substrate 20, the wavelength of the laser light to be inputted into the wavelength conversion element, the wavelength of laser light to be outputted, etc., and the width w of the stripe electrode sections and the gap d between adjacent stripe electrode sections 11 can be suitably determined so that the width of the areas where polarization is reversed (hereinafter referred to as "polarization reversal areas") and the width of areas where polarization is not reversed (hereinafter referred to as "non polarization reversal areas") will be equal.

The ferroelectric crystal substrate 20 is composed of, for example, lithium tantalate (LT) monocrystal or lithium niobate (LN) monocrystal. The thickness of the ferroelectric crystal substrate 20 is, for example, about 0.4 to 1 mm.

The lithium tantalate monocrystal or lithium niobate monocrystal used in the ferroelectric crystal substrate 20 has a congruent composition (congruent melting composition) or stoichiometric composition. For example, in the case of lithium tantalate, by making it into a stoichiometric composition, the coercive electric field becomes about one tenth.

Magnesium (Mg), zinc (Zn), scandium (Sc), indium (In) and the like may also be added to the ferroelectric crystal substrate 20 composed of lithium tantalate monocrystal or lithium niobate monocrystal. It is thereby possible to increase photodamage resistance. Furthermore, in the case of lithium niobate, by adding Mg at about 5 mol %, the coercive electric field decreases to about one fourth.

Silicon oxide (SiOx) film, silicon nitride ($SisN_4$) film, photoresist film or the like is used for the insulation film 30.

For the periodic polarization reversal electrode 10, for example, tantalum (Ta) film, aluminum (Al) film or the like can be used. Gold (Au) film, silver (Ag) film, chromium (Cr) film, copper (Cu) film, nickel (Ni) film, nickel-chromium alloy (Ni—Cr) film, palladium (Pd) film, molybdenum (Mo) film, tungsten (W) film and the like can also be used. The periodic polarization reversal electrode 10 is formed for example by patterning a Ta film formed over the +Z surface 21 of the ferroelectric crystal substrate 20 using photolithographic techniques or the like.

For the planar electrode 40, for example, Ta film or Al film can be used. The planar electrode 40 is formed as a solid electrode over the −Z surface 22 of the ferroelectric crystal substrate 20.

The forming of a periodic polarization reversal structure using the periodic polarization reversal electrode 10 will be described below with reference to FIG. 2(a) and FIG. 2(b) through FIG. 5.

First, a plurality of stripe electrode sections 11 with a stripe shape extending in parallel at a gap from each other are formed over the +Z surface 21 of the ferroelectric crystal substrate 20. For example, a metal film with a film thickness of about 100 nm is formed over the entire +Z surface 21. The metal film is then patterned using photolithographic techniques, etching techniques or the like to form the stripe electrode sections 11, as shown in FIG. 2(a) and FIG. 2(b).

Next, an insulation film 30 is formed over the +Z surface 21 so as to cover the entirety of the plurality of stripe electrode sections 11, as shown in FIG. 3(a) and FIG. 3(b).

For example, a photoresist film with a film thickness of about several hundred nm can be employed as the insulation film 30.

An equipotential electrode section 12 is then formed over the insulation film 30 without contacting the ferroelectric crystal substrate 20 or stripe electrode sections 11. For example, a metal film with a film thickness of about 100 nm formed over the insulation film 30 is patterned to form the equipotential electrode section 12. Here, the equipotential electrode section 12 is arranged so as to have a portion which opposes at least a part of each of the stripe electrode sections 11 across the insulation film 30. For example, the equipotential electrode section 12 may be formed so as to oppose the entirety of all the stripe electrode sections 11, as shown in FIG. 4(a) and FIG. 4(b).

By forming a planar electrode 40 as a solid electrode over the −Z surface 22 of ferroelectric crystal substrate 20, the configuration shown in FIG. 1(a) and FIG. 1(b) is obtained. The planar electrode 40 is arranged over the −Z surface 22 so as to cover at least the entirety of the areas of the −Z surface 22 which oppose the areas of the +Z surface 21 on which the stripe electrode sections 11 are formed.

Figure 5:
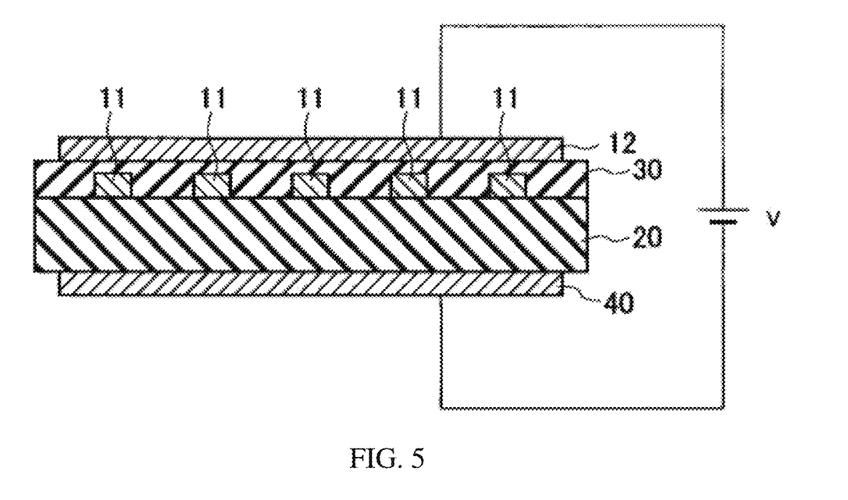
FIG. 5 is a schematic intended to explain a periodic polarization reversal structure forming method using a periodic polarization reversal electrode according to an embodiment of the present invention (part 4).

Subsequently, as shown in FIG. 5, a voltage V is applied between the equipotential electrode section 12 arranged over the +Z surface 21 of the ferroelectric crystal substrate 20 and the planar electrode 40 arranged over the −Z surface 22. As discussed already, the magnitude of the voltage V is set according to the electric field required for causing polarization reversal of the ferroelectric crystal substrate 20 directly below the stripe electrode sections 11.

When a predetermined voltage V is applied between the periodic polarization reversal electrode 10 and the planar electrode 40, an electric field perpendicular to the +Z surface 21 is generated between the periodic polarization reversal electrode 10 and planar electrode 40 over the entire area directly below the stripe electrode sections 11. As a result, polarization reversal occurs uniformly over the entire substrate thickness from the +Z surface 21 to the −Z surface 22 in the ferroelectric crystal substrate 20 directly below the stripe electrode sections 11.

The stripe electrode sections 11 are arranged periodically over the +Z surface 21. Therefore, with the periodic polarization reversal electrode 10 shown in FIG. 1, polarization reversal areas of a uniform shape are formed periodically directly below the stripe electrode sections 11. In other words, a periodic polarization reversal structure periodically comprising alternating polarization reversal areas and non polarization reversal areas is formed in the ferroelectric crystal substrate 20.

A periodic polarization reversal element having a periodic polarization reversal structure in which uniform polarization reversal areas and non polarization reversal areas are alternately arranged can be obtained in the manner described above. For example, a QPM type wavelength conversion element, electro-optical polarizer, terahertz wave generator and the like can be implemented.

Figure 6:
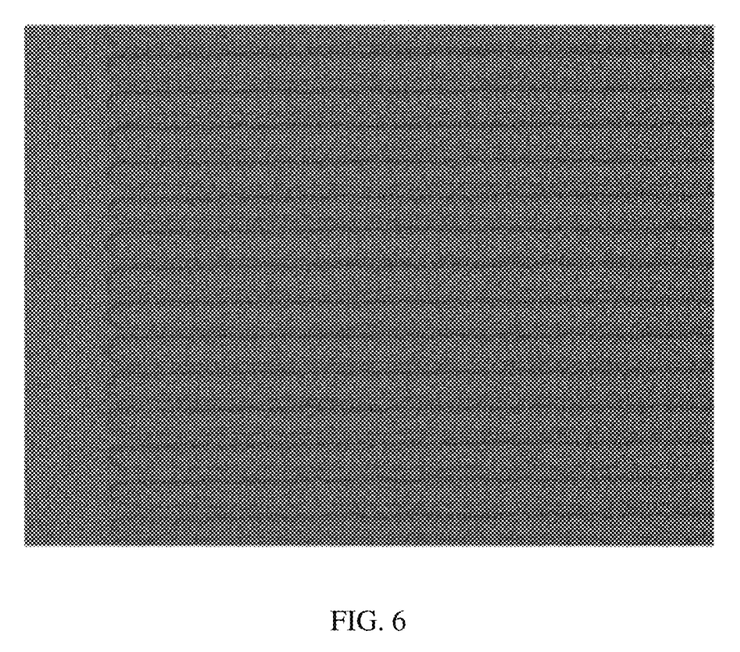
FIG. 6 is a photograph as viewed from the +Z surface direction, showing the state of a periodic polarization reversal structure formed using a periodic polarization reversal electrode according to an embodiment of the present invention.

FIG. 6 shows the state of a periodic polarization reversal structure trial-manufactured using the forming method described above. The trial-manufactured periodic polarization reversal structure was formed using MgO-doped stoichiometric composition lithium tantalate crystals (MgSLT) as the ferroelectric crystal substrate 20. The thickness of the ferroelectric crystal substrate 20 is 0.4 mm. Resist film with a film thickness of 1 μm was used as the insulation film 30. A voltage V of 300 V was then applied between the stripe electrode sections 11 and the planar electrode 40 to form a periodic polarization reversal structure. The width w of a stripe electrode section 11 is 1.3 μm and the pitch t was made 5 μm. The electrode pattern of the stripe electrode sections 11 is preferably determined in consideration of the fact that the polarization reversal areas spread laterally beyond the pattern width during forming, and the like.

FIG. 6 shows the polarization reversal areas and non polarization reversal areas by etching the +Z surface 21 with nitric-hydrofluoric acid, making use of the fact that the etching rate differs between the areas where polarization is reversed and the areas where polarization is not reversed in the ferroelectric crystal substrate 20. On the +Z surface 21 shown in FIG. 6, the polarization reversal areas of high etching rate have become concave areas. As shown in FIG. 6, a periodic polarization reversal structure which accurately reflects the pattern shape of the stripe electrode sections 11 has been formed uniformly across the entirety of the ferroelectric crystal substrate 20.

As a comparison example, an example in which a periodic polarization reversal structure was formed by directly arranging both the stripe electrode sections 11 and equipotential electrode section 12 on the +Z surface 21 of the ferroelectric crystal substrate 20 is presented below. The periodic polarization reversal electrode of the comparison example has a ladder type electrode shape in which the equipotential electrode section 12 is arranged at the periphery of the stripe electrode sections 11.

Figure 7:
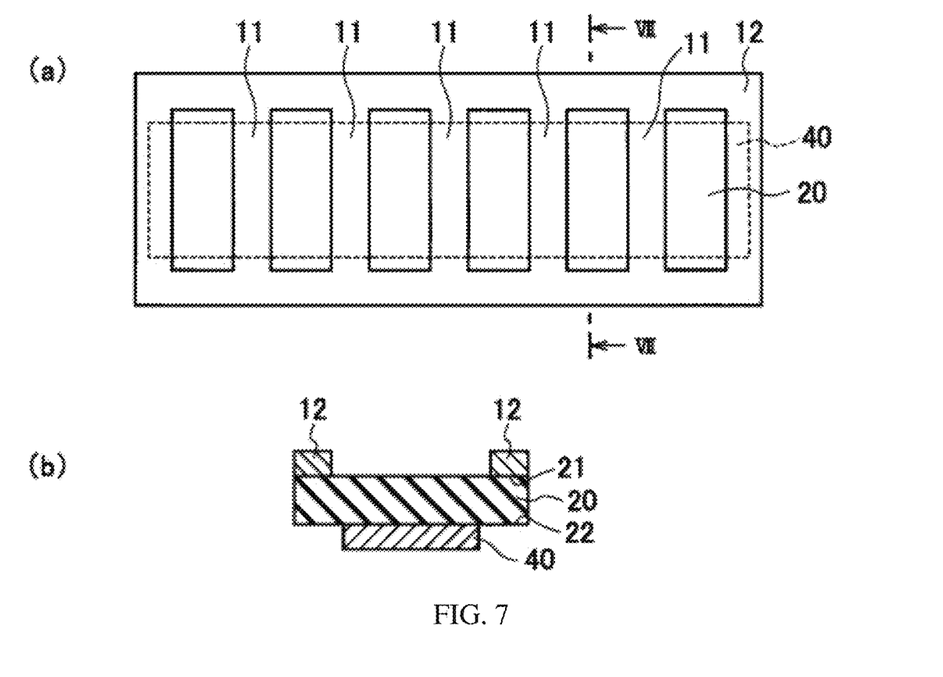
FIG. 7 is a schematic showing the configuration of a periodic polarization reversal electrode of a comparison example, where
Figure 8:
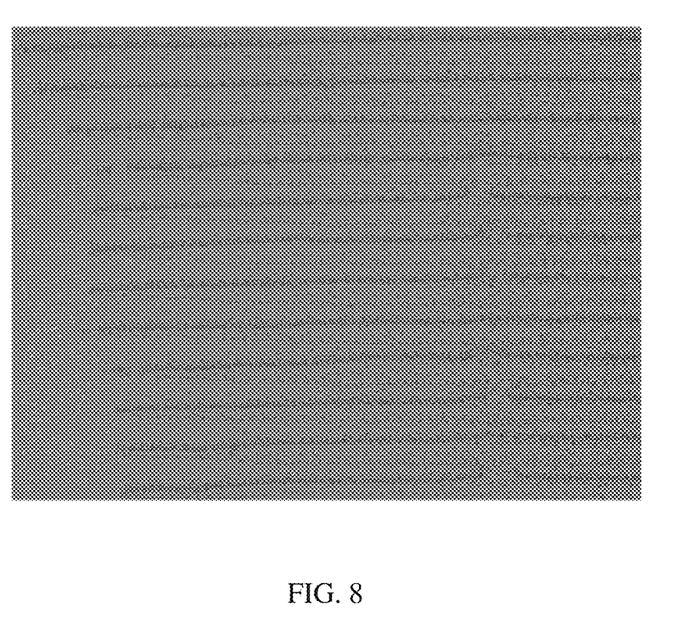
FIG. 8 is a photograph as viewed from the +Z surface direction, showing the state of a periodic polarization reversal structure formed using the periodic polarization reversal electrode of the comparison example shown in FIG. 7(a) through FIG. 7(b).

The comparison example shown in FIG. 7(a) through FIG. 7(b) illustrates a case where the planar electrode 40 is not provided directly below the ends of the stripe electrode sections 11. Namely, the area in which the planar electrode 40 is provided on the −Z surface 22 is smaller than the area in which the stripe electrode sections 11 are provided on the +Z surface 21. The polarization reversal areas and non polarization reversal areas of a periodic polarization reversal structure formed using the periodic polarization reversal electrode shown in FIG. 7(a) through FIG. 7(b) are shown through nitric-hydrofluoric acid etching of the +Z surface 21 in FIG. 8. As shown in FIG. 8, the shape of the ends of the formed periodic polarization reversal structure is not uniformly aligned.

Figure 9:
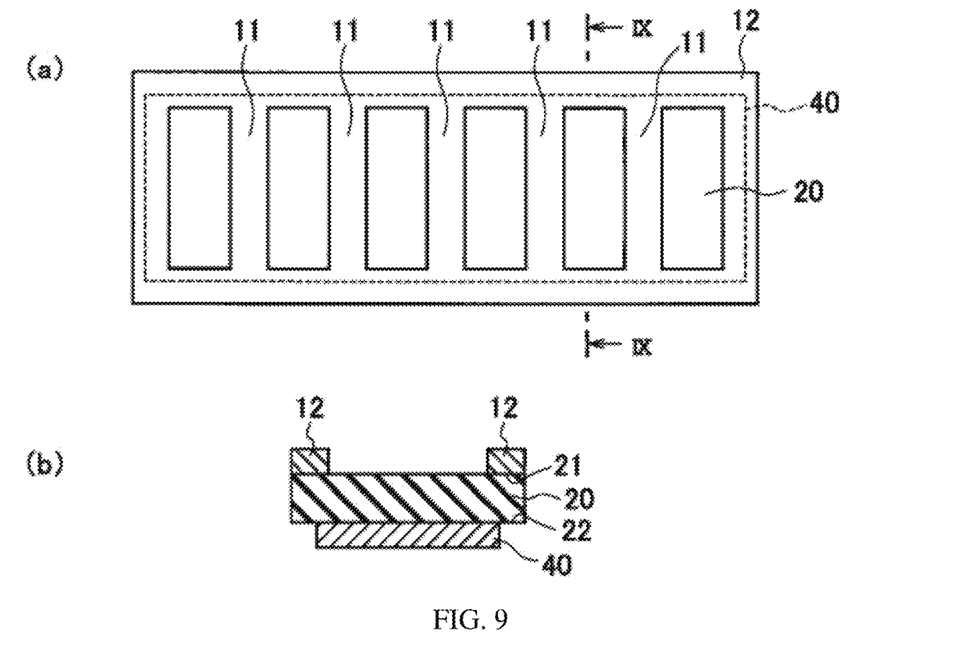
FIG. 9 is a schematic showing the configuration of a periodic polarization reversal electrode of another comparison example, where
Figure 10:
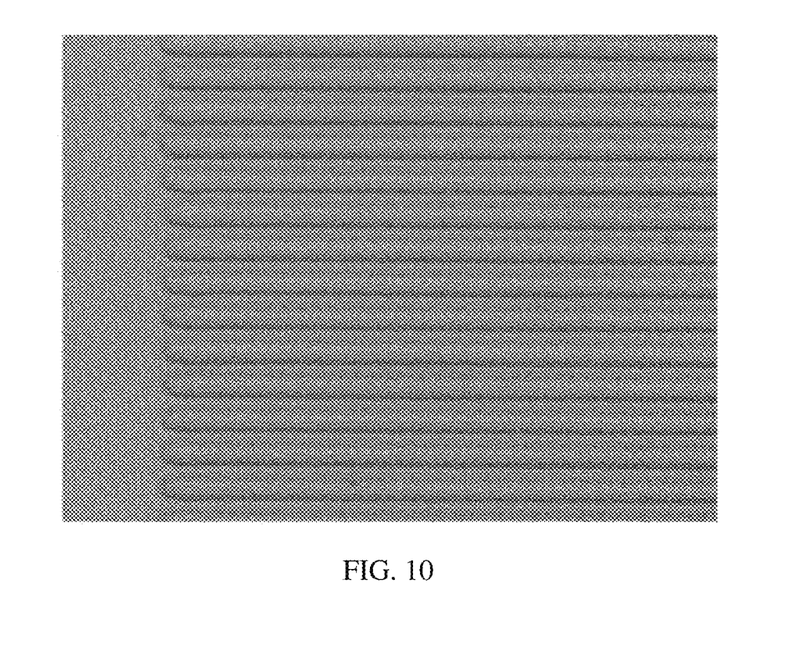
FIG. 10 is a photograph as viewed from the +Z surface direction, showing the state of a periodic polarization reversal structure formed using the periodic polarization reversal electrode of the comparison example shown in FIG. 9(a) through FIG. 9(b).

The comparison example shown in FIG. 9(a) through FIG. 9(b) illustrates a case where the planar electrode 40 is provided directly below the ends of the stripe electrode sections 11. Namely, the area in which the planar electrode 40 is provided on the −Z surface 22 is larger than the area in which the stripe electrode sections 11 are provided on the +Z surface 21. The polarization reversal areas and non polarization reversal areas of a periodic polarization reversal structure formed using the periodic polarization reversal electrode shown in FIG. 9 (a) through FIG. 9 (b) are shown through nitric-hydrofluoric acid etching of the +Z surface 21 in FIG. 10. As shown in FIG. 10, the ends of the periodic polarization reversal structure are aligned straight, but a polarization reversal structure is formed also directly below the equipotential electrode section 12, where there is no need for reversing polarization.

As shown in FIG. 8 and FIG. 10, when the stripe electrode sections 11 and equipotential electrode section 12 are formed in contact with the +Z surface 21, it is difficult to make the shape of the ends of the periodic polarization reversal structure uniform.

Figure 1:
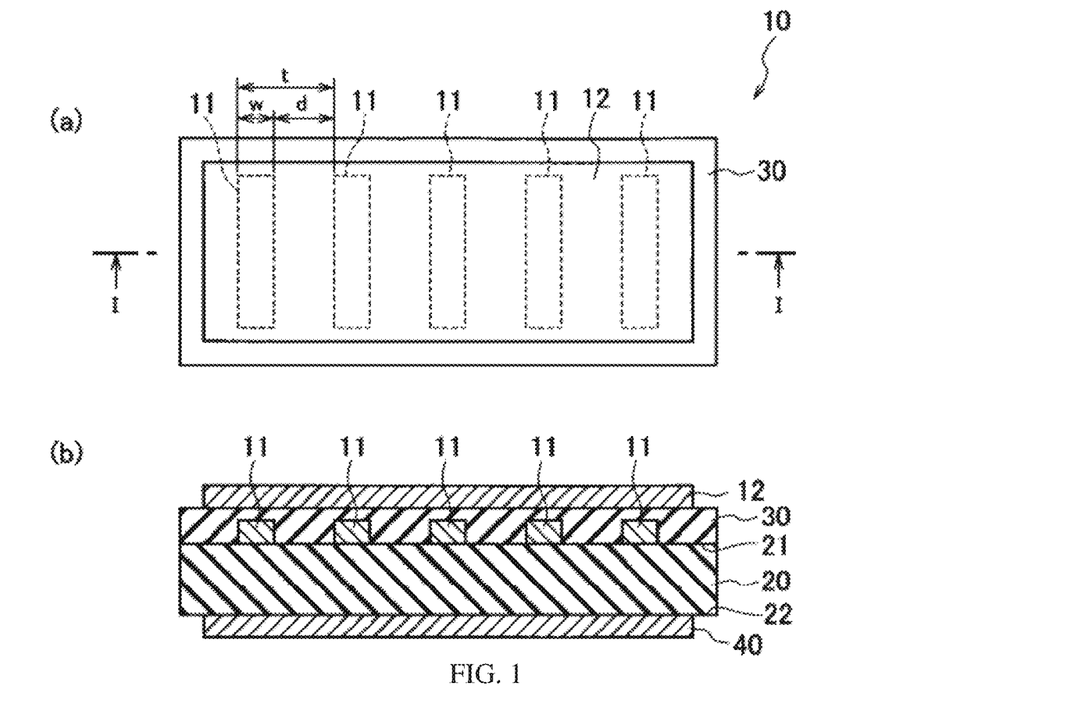
FIG. 1 is a schematic illustrating the configuration of a periodic polarization reversal electrode according to an embodiment of the present invention, where
Figure 2:
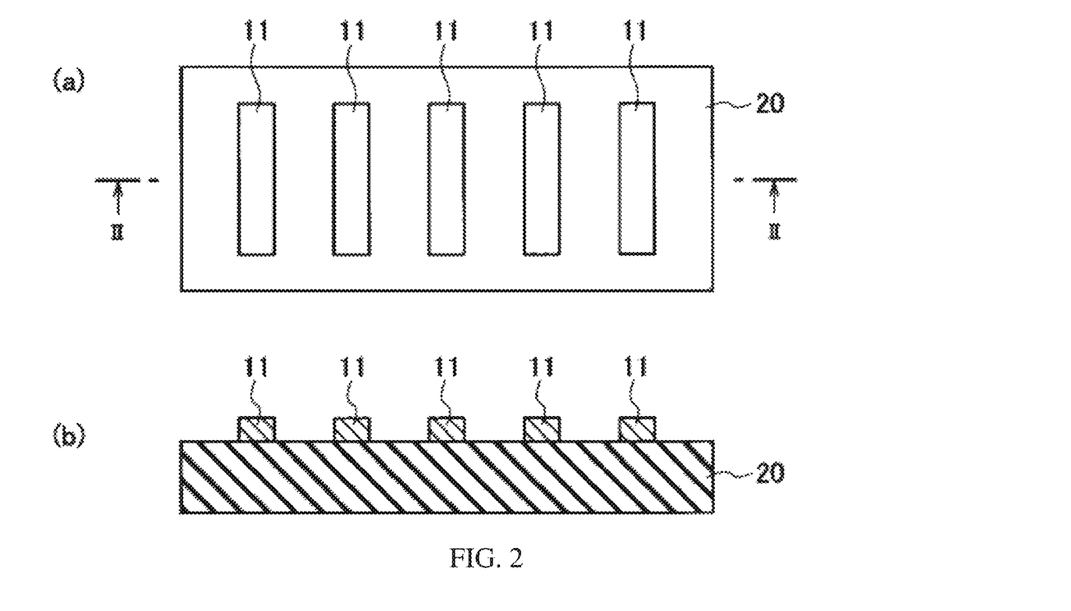
FIG. 2 is a schematic process drawing (part 1) intended to explain a periodic polarization reversal electrode forming method according to an embodiment of the present invention, where
Figure 3:
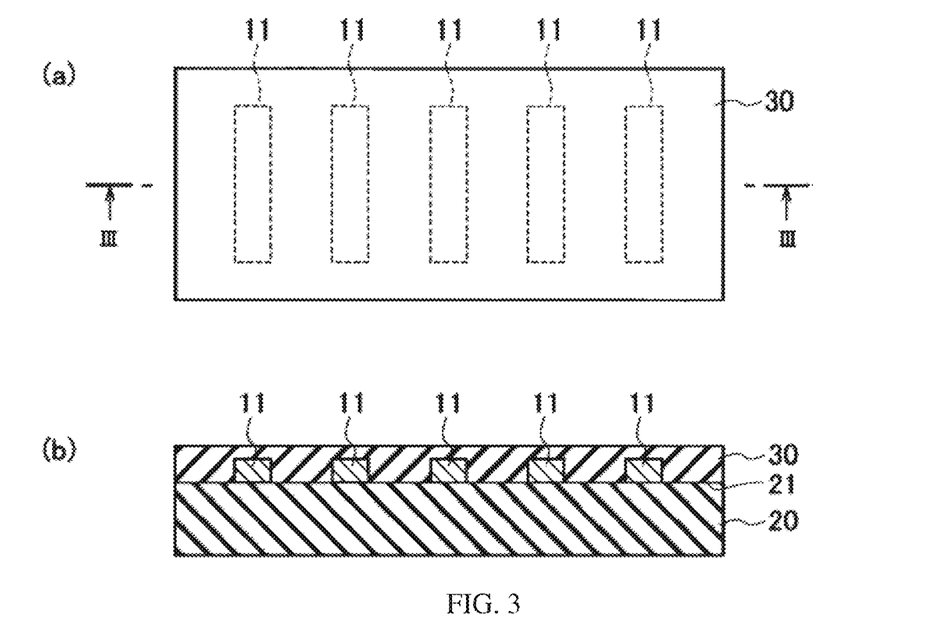
FIG. 3 is a schematic process drawing (part 2) intended to explain a periodic polarization reversal electrode forming method according to an embodiment of the present invention, where
Figure 4:
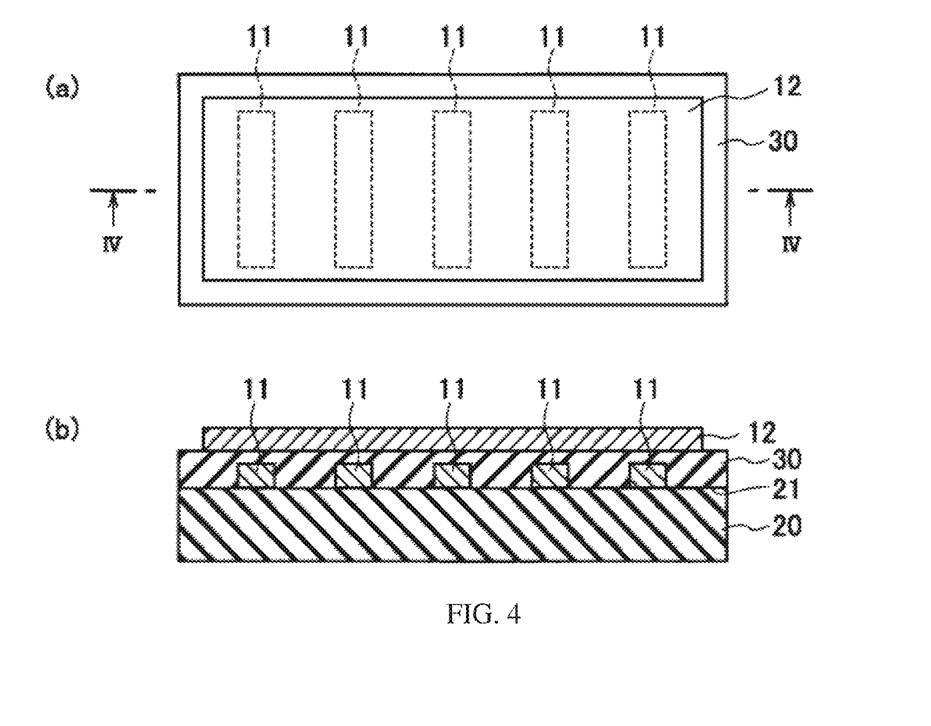
FIG. 4 is a schematic process drawing (part 3) intended to explain a periodic polarization reversal electrode forming method according to an embodiment of the present invention, where

By contrast, in the periodic polarization reversal structure shown in FIG. 1, the ferroelectric crystal substrate 20 does not undergo polarization reversal in the area where no stripe electrode sections 11 are provided. As explained already, this is because the electric field concentrates directly below the side surfaces of the stripe electrode sections 11 due to the edge effect, and no electric field that causes polarization reversal is generated directly below the areas of the +Z surface 21 where no stripe electrode sections 11 are provided. Thus, a periodic polarization reversal structure is formed which reflects only the shape of the stripe electrode sections 11 in contact with the +Z surface 21. As a result, the shape of the ends of the periodic polarization reversal structure can also be controlled with a high precision, allowing the shape of the ends to be made uniform.

With the periodic polarization reversal electrode 10 shown in FIG. 1, as described above, only the stripe electrode sections 11 are provided in contact with the +Z surface 21 of the ferroelectric crystal substrate 20, and the equipotential electrode section 12 which maintains the entirety of the stripe electrode sections 11 at a uniform potential is arranged over the +Z surface 21 across an insulation film 30. In other words, there is no need to form a ladder-shaped electrode or a comb-shaped electrode as the periodic polarization reversal electrode 10. Thus, the ferroelectric crystal substrate 20 undergoes polarization reversal only directly below the stripe electrode sections 11. As a result, a periodic polarization reversal structure can be implemented in which the shape of the ends is uniform. Namely, the shape of the ends of the periodic polarization reversal structure can be controlled so as to be uniform by means of the periodic polarization reversal structure forming method using the periodic polarization reversal electrode 10.

Modified Example

FIG. 1 illustrates the case where the equipotential electrode section 12 is arranged opposite the entirety of the plurality of stripe electrode sections 11 across an insulation film 30. However, it suffices for the equipotential electrode section 12 to have a portion which opposes at least a part of each of the plurality of stripe electrode sections 11 across the insulation film 30. As a result, when a voltage is applied to each of the stripe electrode sections 11, the entirety of the stripe electrode sections 11 will be maintained at a uniform potential.

Figure 11:
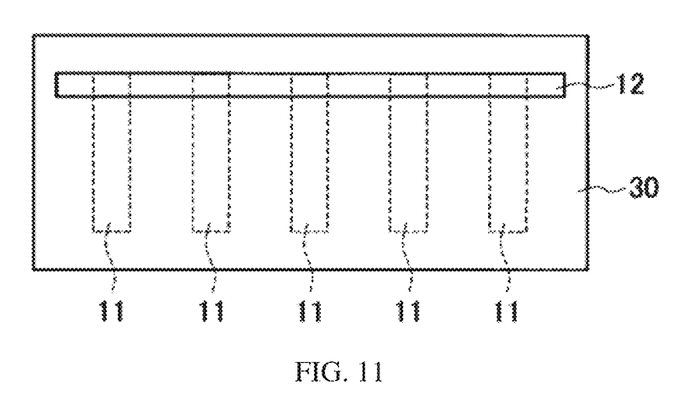
FIG. 11 is a schematic plan view showing the configuration of a periodic polarization reversal electrode according to a modified example of an embodiment of the present invention.

For example, the equipotential electrode section 12 can have a band shape having a portion which opposes a part of each of the plurality of stripe electrode sections 11. FIG. 11 shows an example in which the equipotential electrode section 12 is arranged opposite only one end of each of the plurality of stripe electrode sections 11. Alternatively, as shown in FIG. 12, the equipotential electrode section 12 may be arranged opposite areas other than the ends of the stripe electrode sections 11.

Figure 12:
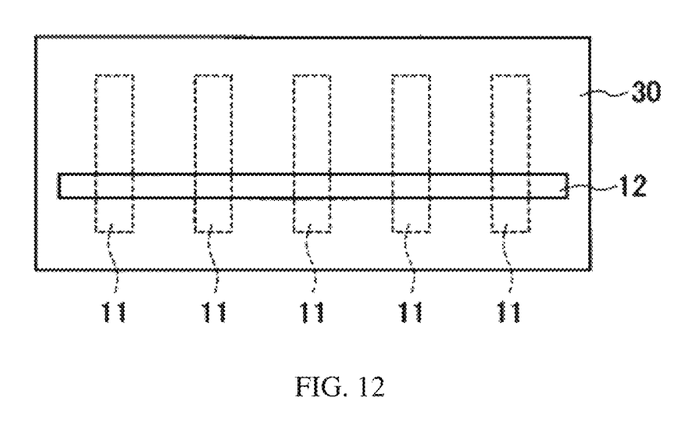
FIG. 12 is a schematic plan view showing the configuration of a periodic polarization reversal electrode according to another modified example of an embodiment of the present invention.

FIG. 11 and FIG. 12 show examples where the equipotential electrode section 12 extends in a direction perpendicular to the direction in which the stripe electrode sections 11 extend. However, as shown in FIG. 13, the equipotential electrode section 12 may also be arranged so as to extend in a direction which diagonally intersects the direction in which the stripe electrode sections 11 extend.

Figure 13:
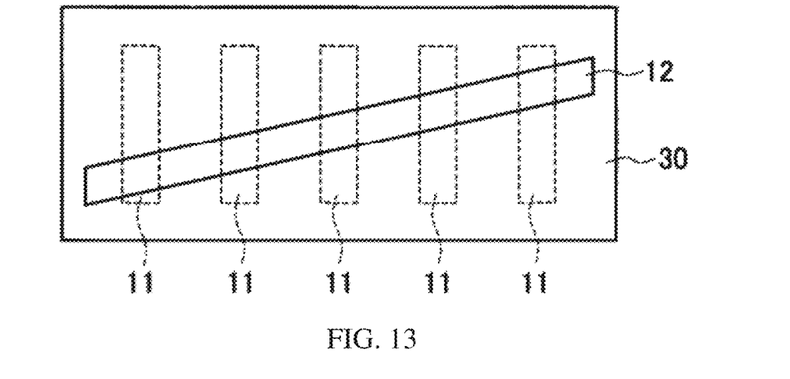
FIG. 13 is a schematic plan view showing the configuration of a periodic polarization reversal electrode according to yet another modified example of an embodiment of the present invention.

By employing an equipotential electrode section 12 having a band shape as shown in FIG. 11 through FIG. 13, it is possible to prevent the ferroelectric crystal substrate 20 from undergoing polarization reversal between stripe electrode sections 11 due to the electric field between the planar electrode 40 and equipotential electrode section 12 arranged over the +Z surface 21.

Figure 14:
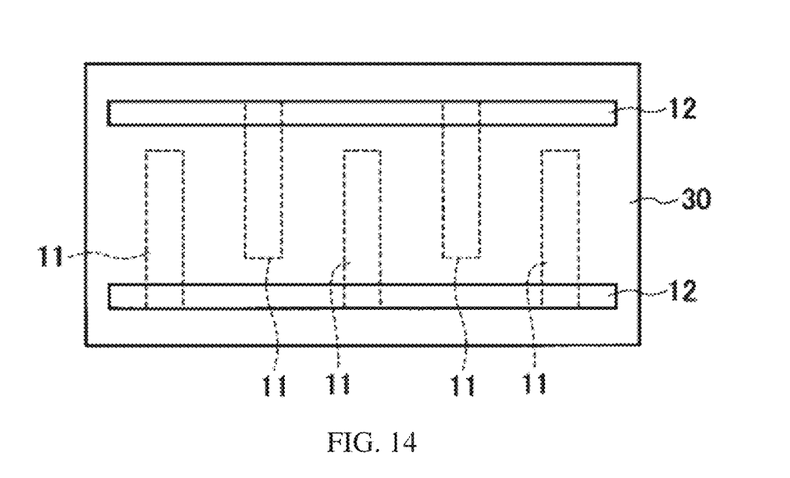
FIG. 14 is a schematic plan view showing the configuration of a periodic polarization reversal electrode according to yet another modified example of an embodiment of the present invention.

Furthermore, multiple equipotential electrode sections 12 may be arranged over the insulation film 30. FIG. 14 shows an example in which two equipotential electrode sections 12 which extend in parallel at a gap from each other are arranged over the insulation film 30. The number of equipotential electrode sections 12 may also be three or more, and the multiple equipotential electrode sections 12 may also be arranged not in parallel to each other. It suffices for the stripe electrode sections 11 to oppose at least one of the plurality of equipotential electrode sections 12.

In the modified example shown in FIG. 14, the stripe electrode sections 11 whereof the ends oppose one of the two equipotential electrode sections 12 and the stripe electrode sections 11 whereof the ends oppose the other equipotential electrode section 12 are arranged in alternation. Namely, each of the plurality of stripe electrode sections 11 opposes only one of the two equipotential electrode sections 12. Thus, this is useful for forming polarization reversal areas with a short pitch, as described below.

When the pitch t of the stripe electrode sections 11 is short, there is the concern that adjacent polarization reversal areas will become continuous when polarization is reversed. However, with the periodic polarization reversal electrode 10 shown in FIG. 14, voltage can be applied with different timings to the multiple equipotential electrode sections 12. As a result, the gap between simultaneously formed polarization reversal areas can be substantially increased, making it possible to prevent adjacent polarization reversal areas from becoming continuous. Thus, polarization reversal areas with a short pitch can be formed satisfactorily.

Other Embodiments

The present invention was described above by means of an embodiment, but the description and drawings forming part of this disclosure should not be interpreted as limiting this invention. Various alternative embodiments, working examples and operational technologies should be clear to those skilled in the art based on this disclosure.

In the description of the already discussed embodiments, examples were shown where the equipotential electrode section 12 was a metal electrode. However, the equipotential electrode section 12 need not be a metal electrode, so long as it has the function of allowing voltage to be applied to the stripe electrode sections 11 across the insulation film 30. Thus, for example, a liquid electrode or conductive polymer may also be used as the equipotential electrode section 12.

In this way, the present invention of course includes various embodiments, etc. which have not been described here. Thus, the technical scope of the present invention is determined solely by the specifying features of the invention according to the scope of patent claims, as appropriate in light of the foregoing description.

EXPLANATION OF REFERENCES

10 . . . Periodic polarization reversal electrode
11 . . . Stripe electrode section
12 . . . Equipotential electrode section
20 . . . Ferroelectric crystal substrate
21 . . . +Z surface
22 . . . −Z surface
30 . . . Insulation film
40 . . . Planar electrode

What is claimed:
1. A cyclic polarization reversal structure forming method comprising:
   forming a plurality of stripe electrode sections with a stripe shape extending in parallel at a gap from each other, on the +Z surface of a ferroelectric crystal substrate in contact with said ferroelectric crystal substrate;

forming an insulation film over said +Z surface so as to cover said plurality of stripe electrode sections;

forming an equipotential electrode section, which has a portion that only partially opposes each of said plurality of stripe electrode sections across said insulation film, over said insulation film without contacting said ferroelectric crystal substrate or said plurality of stripe electrode sections;

forming a planar electrode, on the −Z surface of said ferroelectric crystal substrate that opposes said +Z surface, so as to cover the entire area that opposes said +Z surface area on which said plurality of stripe electrode sections are formed; and applying a voltage between said equipotential electrode section and said planar electrode to generate an electric field between said plurality of stripe electrode sections and said planar electrode and create a polarization reversal structure on said ferroelectric crystal substrate directly below said plurality of stripe electrode sections.

2. The cyclic polarization reversal structure forming method described in claim 1, characterized in that said equipotential electrode section is formed in a band shape so as to have portions which oppose a part of each of said plurality of stripe electrode sections.

3. The cyclic polarization reversal structure forming method described in claim 2, characterized in that said equipotential electrode section is formed so as to extend in a direction perpendicular to the direction in which said plurality of stripe electrode sections extend.

4. The cyclic polarization reversal structure forming method described in claim 2, characterized in that said equipotential electrode section is formed so as to extend in a direction which diagonally intersects the direction in which said plurality of stripe electrode sections extend.

5. The cyclic polarization reversal structure forming method described in claim 1, characterized in that said equipotential electrode section comprises a plurality of equipotential electrode sections, and characterized in that said plurality of equipotential electrode sections are formed over said insulation film at a gap from each other, and said plurality of stripe electrode sections are made to oppose at least one of the plurality of equipotential electrode sections.

6. The cyclic polarization reversal structure forming method described in claim 5, characterized in that adjacent aforementioned stripe electrode sections are formed so that each of them opposes a different aforementioned equipotential electrode section.

* * * * *